United States Patent [19]
Kirimoto et al.

[11] Patent Number: 4,939,745
[45] Date of Patent: Jul. 3, 1990

[54] APPARATUS FOR GENERATING ORTHOGONAL SEQUENCES

[75] Inventors: Tetsuo Kirimoto; Takashi Hotta; Yoshimasa Ohashi, all of Kanagawa, Japan

[73] Assignee: Mitsubishi Denki Kabushiki Kaisha, Tokyo, Japan

[21] Appl. No.: 399,772

[22] Filed: Aug. 28, 1989

[30] Foreign Application Priority Data

Sep. 1, 1988 [JP]  Japan .................................. 63-219215
Feb. 28, 1989 [JP]  Japan .................................... 1-46790

[51] Int. Cl.$^5$ ............................................. H04L 9/04
[52] U.S. Cl. ......................................................... 375/1
[58] Field of Search ......................... 375/1, 37; 380/34

[56] References Cited

U.S. PATENT DOCUMENTS 4,403,331  9/1983  Halpern et al. ......................... 375/37
4,685,132  8/1987  Bishop et al. ............................ 375/1
4,872,200 10/1989  Jansen ..................................... 375/1

Primary Examiner—Salvatore Cangialosi
Attorney, Agent, or Firm—Wolf, Greenfield & Sacks

[57] ABSTRACT

An apparatus for generating orthogonal sequences is disclosed which includes an M-sequence generator for providing a signal of M-sequence of which the component takes 0 or 1 and the period is N, and substitution means connected to the output of the M-sequence generator for substituting the component of the M-sequence. The substitution means substitute the component with $A_0 e^{j\phi_0}$ when the value of the component is 0 and with $A_1 e^{j\phi_1}$ when it is 1, where each of $A_0$ and $A_1$ is a positive real number, and the substitution is performed so that a trigonometric function $f_1(\phi_1 - \phi_0)$ having a phase of $(\phi_1 - \phi_0)$ is a ratio of two functions $f_2(A_1/A_0)$ which is a quadratic function of $A_1/A_0$ with a coefficient of a linear function of N and $f_3(A_1/A_0)$ which is a linear function of $A_1/A_0$ with a coefficient of a linear function of N, whereby the orthogonal sequence is generated from the substitution means.

15 Claims, 12 Drawing Sheets $$\cos \phi = \frac{(N+1)A^2 + N - 3}{2(N+1)A}$$

$$\cos \phi = \frac{N-1}{N+1}$$

APPARATUS FOR GENERATING ORTHOGONAL SEQUENCES

1. BACKGROUND OF THE INVENTION

This invention relates to an apparatus for generating orthogonal sequences for code-modulating transmission signals for use in spread spectrum communication systems, radar systems or the like.

2. DESCRIPTION OF THE PRIOR ART

Before describing the prior art, the mathematical properties of the orthogonal sequences will first be described.

The term "sequence" used herein means time series of numerical values $a_n$ shown in expression (1), below:

$$\{a_n\} = \ldots a_{n-1} a_n a_{n+1} \tag{1}$$

n is a factor representing the order of the sequences. $a_n$ is referred to as a component of sequence and is a complex number. The sequence $\{a_n\}$ is a periodic sequence in which there exists an integral number of N satisfying expression (2), below:

$$a_{n+N} = a_n \tag{2}$$

Thus, the sequence of expression (1) can be denoted by expression (3), below:

$$\{a_n\} = \ldots a_{N-1} a_0 a_1 a_2 \ldots a_{N-1} a_0 a_1 \tag{3}$$

In order to provide a quantum for describing the mathematical properties of such a sequence, an autocorrelation function as defined by expression (4), below, is often used:

$$\rho_{(m)} = \frac{1}{N} \sum_{n=0}^{N-1} a_n^* a_{n+m} \tag{4}$$

$$(m = 0, 1, \ldots, N-1)$$

Wherein, * represents a complex conjugate. The reason why the autocorrelation function is defined only within the range from m=0 to m=N−1, as shown in expression (4), is that the sequence $\{a_n\}$ is a periodic series and thus the autocorrelation function $\rho_{(m)}$ is a periodic function. The period thereof is N and the same as that of the sequence $\{a_n\}$. Thus the function $\rho_{(m)}$ satisfies the following expression:

$$\rho_{(m+N)} = \rho_{(m)} \tag{5}$$

When such a sequence is applied to a practical system, it is necessary that the autocorrelation function of expression (4) has such properties as shown in FIG. 1, i.e., the function of autocorrelation has a sharp peak at m=0 and takes a "considerably low value" in the remaining range of m (m=1, ..., N−1). The portion $\rho_{(0)}$ of the function at m=0 is referred to as the lobe, and the other portion $\rho_{(m)}$ (m=1, ..., N−1) of the function than that at m=0 is referred to as the side lobe, and the magnitude of the side lobe relative to the main lobe $\rho_{(0)}$ poses a problem to be discussed. The magnitude of the side lobe which is a "considerable low value" must thus satisfy relation (6), below:

$$|\rho_{(m)}| << |\rho_{(0)}| \quad m=1, \ldots, N-1 \tag{6}$$

With the satisfaction of relation (6), the sequence having zero magnitude of the side lobe of the autocorrelation function, i.e., satisfying expression (7), below, has excellent properties:

$$\rho_{(m)} = \begin{cases} \rho_{(0)} & m = 0 \\ 0 & 1 \leq n \leq N-1 \end{cases} \tag{7}$$

The orthogonal sequence is defined as satisfying expression (7).

The usefulness of such an orthogonal sequence in its application to a practical system will be described below with reference to FIG. 2.

FIG. 2 is a schematic representation of an example in which the orthogonal sequence is applied to a radar system for detecting a target or targets. In FIG. 2, numeral 1 refers to a local oscillator, 2 to a modulator, 3 to an orthogonal sequence generator, 4 to a power amplifier, 5 to a low-noise amplifier, 6 to a transmitting-antenna, 7 to a receiving-antenna, 8 to a phase detector and 9 to a demodulator. Numerals 10a and 10b also refer to targets A and B. Further, $\{a_n\}$ is a sequence, U a transmission signal, $S_a$ a reflected signal produced by the reflection of the transmission signal U on the target A (or 10a), $S_b$ a reflected signal produced by the reflection of the transmission signal U on the target B (or 10b), R a receiving signal, V a detection signal and Z a demodulated signal.

For simplifying the description hereinbelow, all the mathematical expressions of signals will be referred to by complex signals. Physically, there is no such complex signal, but a real signal can correspond to the real part of the complex signal, as expressed by Euler's formula, below:

$$e^{j\omega t} = \cos \omega t + j \sin \omega t \tag{8}$$

(j: unit of complex number)

The local oscillator 1 generates a sinusoidal wave signal $e^{j\omega t}$ and transfers it to the modulator 2. On the other hand, the orthogonal sequence generator 3 generates a sequence $\{a_n\}$ and transfers it to the modulator 2 which, in turn, code modulates the sinusoidal wave signal $e^{j\omega t}$ with the sequence $\{a_n\}$ to output the transmission signal U. The transmission signal U is amplified by the power amplifier 4 and then radiated through the transmitting-antenna 6 into the external space. The transmission signal U radiated to the external space is partly reflected by the target 10a and partly by the target 10b, thereby producing the reflected signals $S_a$ and $S_b$. The reflected signals $S_a$ and $S_b$ are received by the receiving-antenna 7. The receiving signal R is a compound signal of the reflected signals $S_a$ and $S_b$ and has the following relation:

$$R = S_a + S_b \tag{9}$$

The receiving signal R is amplified by the low-noise amplifier 5 and then input into the phase detector 8. The latter acts to convert the receiving signal R in RF (radio frequency) band to a detection signal V in VF (video frequency) band by phase detecting the receiving signal R and then transfer the detection signal V to the demodulator 9. The demodulator 9 receives the detection signal V and the sequence $\{a_n\}$ transferred from the orthogonal sequence generator 3, demodulates the detection signal V including a code-modulation signal and then outputs the demodulated signal Z.

The operation of the radar system shown in FIG. 2 will be described in more detail by reference to FIGS. 3 and 4. FIG. 3 shows a timed relationship between a transmission signal and a receiving signal, and FIG. 4 is a vector diagram of the component $a_n$ of the sequence. In FIG. 3, U, $S_a$, $S_b$ and R designate explanatory waveforms of a code-modulated transmission signal, a signal reflected by target A, a signal reflected by target B and a receiving signal, respectively. As shown in FIG. 3, the sinusoidal wave signal is subjected to code-modulation with the components $a_0, a_1, \ldots, a_{N-1}$, which are selected one by one at every period of time $\tau$, namely component $a_0$ is used in the time interval between $t=0$ and $t=\tau$ and component $a_1$ is used in the time interval between $t=\tau$ and $t=2\tau, \ldots$, thereby producing a code-modulated transmission signal. The mathematical expression $U_{(t)}$ of the code-modulated transmission signal U is given by the following expression:

$$U_{(t)} = \sum_{n=-\infty}^{\infty} \text{rect}\left[\frac{t - n\tau}{\tau}\right] a_n e^{j\omega t} \tag{10}$$

where, rect [t] is a rectangular function as defined by the following expression:

$$\text{rect}[t] = \begin{cases} 1 & 0 \leq t < 1 \\ 0 & \text{otherwise} \end{cases} \tag{11}$$

The rectangular function mathematically expresses the changeover of the components of the sequence $\{a_n\}$, and the modulation is expressed by the product of the component $a_n$ and the sinusoidal wave signal $e^{j\omega t}$. Since the modulation is expressed by the product, the component $a_n$ can be definitely expressed by a vector as shown in FIG. 4. The amplitude $|a_n|$ of the component $a_n$ shows the modulation of the amplitude of the sinusoidal wave signal and the phase $\phi_n$ of the component $a_n$ shows the modulation of the phase of the sinusoidal wave signal. Since the sequence $\{a_n\}$ is a periodic series, the modulation to be applied to the sinusoidal wave signal also has a periodicity as shown in FIG. 3. The periodicity T is expressed by:

$$T = N\tau \tag{12}$$

Because the reflected signals are created by reflecting a part of the transmission signal on the targets, the waveforms of the reflected signals $S_a$, $S_b$ are similar to the waveform of the transmission signal, as shown in FIG. 3. The timing each of the reflected signals being received by the receiving-antenna 7 is delayed by such a time as required for the radio wave to propagate two times the slant range between the radar system and each target. Such a time delay is indicated by $t_a$ with respect to the reflected signal $S_a$ and also by $t_b$ with respect to the reflected signal $S_b$ in FIG. 3. Thus, the mathematical expressions $S_a(t)$, $S_b(t)$ of the reflected signals $S_a$, $S_b$ are expressed by the following expressions:

$$\begin{aligned} S_a(t) &= \eta_a U(t - t_a) \\ &= \eta_a \sum_{n=-\infty}^{\infty} \text{rect}\left[\frac{t - t_a - n\tau}{\tau}\right] a_n e^{j\omega(t - t_a)} \end{aligned} \tag{13}$$

$$\begin{aligned} S_b(t) &= \eta_b U(t - t_b) \\ &= \eta_b \sum_{n=-\infty}^{\infty} \text{rect}\left[\frac{t - t_b - n\tau}{\tau}\right] a_n e^{j\omega(t - t_b)} \end{aligned} \tag{14}$$

where, $\eta_a$, $\eta_b$ are constant values representing the intensities of reflection of the radio waves on the targets A (or 10a) and B (or 10b).

Since the receiving signal R is a compound signal formed by both the reflected signals $S_a$ and $S_b$ as indicated by expression (9), its mathematical expression $R(t)$ is given as follows:

$$\begin{aligned} R(t) &= S_a(t) + S_b(t) \\ &= \eta_a U(t - t_a) + \eta_b U(t - t_b) \\ &= \eta_a \sum_{n=-\infty}^{\infty} \text{rect}\left[\frac{t - t_a - n\tau}{\tau}\right] a_n e^{j\omega(t - t_a)} + \\ &\quad \eta_b \sum_{n=-\infty}^{\infty} \text{rect}\left[\frac{t - t_b - n\tau}{\tau}\right] a_n e^{j\omega(t - t_b)} \end{aligned} \tag{15}$$

The phase detector 8 detects the receiving signal R and this is mathematically equivalent to the multiplication of $e^{-j\omega t}$. Thus, the mathematical expression $V(t)$ of the detection signal V is given as follows:

$$\begin{aligned} V(t) &= R(t) e^{-j\omega t} \\ &= \eta_a \sum_{n=-\infty}^{\infty} \text{rect}\left[\frac{t - t_a - n\tau}{\tau}\right] a_n e^{-j\omega t_a} + \\ &\quad \eta_b \sum_{n=-\infty}^{\infty} \text{rect}\left[\frac{t - t_b - n\tau}{\tau}\right] a_n e^{-j\omega t_b} \end{aligned} \tag{16}$$

The correlation process of the detection signal V and the sequence $\{a_n\}$ is performed in the demodulator 9. As a method of such a correlation process, there are two types, an analog type and a digital type, but the difference between both types is only that the demodulated signal Z produced as a result of the process is outputted with an analog signal or a ditigal signal.

The case of the correlation process being of the digital type will be described below. In this case, the detection signal V transferred from the phase detector 8 is first sampled and converted to a digital signal at the demodulator 9. The sampling period is set as same as the time $\tau$ of the components as shown in FIG. 3. The numeral expression of the detection signal $V(k\tau)$ ($k = \ldots, -1, 0, 1, \ldots$) which is converted to the digital signal is given by the following expression based on expression (16).

$$\begin{aligned} V(k\tau) &= V(k) \\ &= \eta_a \sum_{n=-\infty}^{\infty} \text{rect}[k - k_a - n] a_n e^{-j\omega k_a \tau} + \\ &\quad \eta_b \sum_{n=-\infty}^{\infty} \text{rect}[k - k_b - n] a_n e^{-j\omega k_b \tau} \end{aligned} \tag{17}$$

where,
$$t_a = k_a \tau; \tag{18a}$$
and
$$t_b = k_b \tau. \tag{18b}$$

Taking into consideration the rectangular function rect (t) taking 0 out of the range of $0 \leq t < 1$, as shown in expression (11), expression (17) can simply be expressed by the following expression.

$$V(k) = \eta_a e^{-j\omega\tau k a} a_{k-k_a} + \eta_b e^{-j\omega\tau k b} a_{k-k_b} \quad (19)$$

The demodulator 9 then performs such a correlation process operation as shown in the following expression using the sampled detection signal V(k) and the sequence $\{a_n\}$ transferred from the orthogonal sequence generator 3, as shown in expression (19), to output the demodulated signal Z(k):

$$Z(k) = \frac{1}{N} \sum_{n=0}^{N-1} a_n^* V(n+k) \quad (20)$$

To explain in detail the demodulated signal Z(k) shown by expression (20), expression (19) is substituted for by expression (20), whereby the following expression is obtained:

$$Z(k) = \frac{1}{N} \sum_{n=0}^{N-1} a_n^* (\eta_a e^{-j\omega\tau k a} a_{n+k-k_a} + \eta_a e^{-j\omega\tau k b} a_{n+k-k_b}) \quad (21)$$

$$= \eta_a e^{-j\omega\tau k a} \left[ \frac{1}{N} \sum_{n=0}^{N-1} a_n^* a_{n+k-k_a} \right] +$$

$$\eta_b e^{-j\omega\tau k b} \left[ \frac{1}{N} \sum_{n=0}^{N-1} a_n^* a_{n+k-k_b} \right]$$

Comparing expression (21) with expression (4), the terms parenthesized by [ ] in expression (21) are nothing but the autocorrelation function of the sequence $\{a_n\}$. Expression (21) can be rewritten using the atuocorrelation function of the sequence to obtain expression (22), below:

$$Z(k) = \eta_a e^{-j\omega k a} \rho_{(k-k_a)} + \eta_b e^{-j\omega k b} \rho_{(k-k_b)} \quad (22)$$

As shown by expression (22), the demodulated signals Z(k) is in the form of adding the autocorrelation functions of the sequence $\{a_n\}$.

FIG. 5 shows waveforms of the amplitude of the demodulated signal Z(k) for explaining that the orthogonal sequence is useful. FIGS. 5(a) and (b) show amplitude-waveforms of the demodulated signal Z(k) in the case of the sequence being non-orthogonal, and FIG. 5(c) shows amplitude-waveforms in the case of the sequence being orthogonal. In these figures, waveforms $Z_a$ and $Z_b$ are main lobes of the autocorrelation function and waveforms $Y_a$ and $Y_b$ are side lobes thereof. As seen in FIGS. 5(a) and (b), in the case of the sequence being non-orthogonal, it will be understood that the main and side lobes interfere with one another. As shown in FIG. 5(a), when there is no substantial difference in magnitude between $\eta_a$ and $\eta_b$ (no remarkable difference between the intensities of reflection of the radio waves on the targets 10a and 10b), the interference between the main and side lobes is not so serious that the reception of the reflected signals from both the targets can be detected based on the demodulated signal. On the contrary, when there is a substantial difference in magnitude between $\eta_a$ and $\eta_b$ (large difference between the intensities of reflection of the radio waves on the targets 10a and 10b), the interference between the main and side lobes is a serious problem. As shown in FIG. 5(b), for example, if the main lobe $Z_b$ for the target 10b is covered with the side lobe $Y_a$ for the target 10a, the reception of the reflected signals from both the targets cannot be detected and the reception may be defined as if it would be from only the target 10a. A situation where there is a large difference in the intensities of reflection on two adjacent targets is often experienced in the practical circumstances of the operation of radar systems, typically when an airplane or the like is flying near a mountain, for example.

Such problem can apparently be solved by using an orthogonal sequence for the sequence, as shown in FIG. 5(c). With the orthogonal sequence, the side lobe is zero and thus a small-magnitude signal of the main lobe is not covered with any large-magnitude signal of the side lobe and the two signals can be detected based on the demodulated signal no matter which one of the signals has a larger magnitude than the other.

Although the description has been made while limiting the number of targets to two, in the case of the simultaneous reception of reflected signals from an N-number of targets, the detection can be similarly achieved by using the orthogonal sequence, irrespective of the relative sizes of these targets.

As conventional systems for generating orthogonal sequences having the excellent properties as described above, a polyphase orthogonal sequence has been known which is disclosed in "Phase Shift Pulse Code with Good Periodic Correlation Properties" by R. Frank, IRE Trans., U.S.A., Information Theory, Vol. IT-8, published October, 1962.

FIG. 6 shows a flowchart of the algorithm for generating a conventional polyphase orthogonal sequence. One period of the polyphase orthogonal sequence is an orthogonal sequence having components ($W^K$), each of which is obtained in accordance with the algorithm. Namely, the value W is first calculated at the step 11 as the following expression:

$$W = \exp\left[j2\pi \frac{1}{L}\right] \quad (23)$$

wherein L is a natural number. The K-th power of the value W is then obtained at the step 14 as the following expression:

$$W^K = \exp\left[j2\pi \frac{K}{L}\right] \quad (24)$$

wherein K is an integer. The respective components are aligned with their I and L increased one by one from I=0 and J=0 to I=L−1 and J=L−1, as shown at the steps 12 through 18. This forms square L×L matrix as shown in Table 1 and corresponds to sequential rows from the first line to the L-th line.

TABLE 1

| Line 1 | $W^0, W^0, \ldots, W^0$ |
| Line 2 | $W^1, W^2, \ldots, W^{L-1}$ |
| Line 3 | $W^2, W^4, \ldots, W^{2(L-1)}$ |
| . | . |
| . | . |
| Line L | $W^{L-1}, W^{(L-1)2}, \ldots, W^{(L-1)(L-1)}$ |

Thus, the polyphase orthogonal sequence is given by the following expression:

$$\{a_n\} = \begin{matrix} W^0, W^0, \ldots, W^0, \\ \text{Line 1} \\ W^1, W^2, \ldots, W^{L-1}, \ldots \\ \text{Line 2} \\ W^{L-1}, W^{(L-1)2}, W^{(L-1)(L-1)} \\ \text{Line } L \end{matrix} \quad (25)$$

As is apparent from expression (25), the period N of the polyphase orthogonal sequence is determined only by L and given by the following expression:

$$N = L^2 \quad (26)$$

The components of the polyphase orthogonal sequence will now be described in detail.

As seen in expression (24), the amplitude of the component $W^K$ of the polyphase orthogonal sequence is 1 irrespective of the value of K and there is no need to amplifyingly modulate the sinusoidal wave signal in code-modulation using the polyphase orthogonal sequence. On the other hand, the phase of the component $W^K$ can be considered as follows. Using integers p and q, the integer K can be expressed as:

$$K = pL + q \quad (27a)$$

wherein $$0 \leq q < L \quad (27b)$$

Therefore, expression (24) can be modified as follows:

$$\begin{aligned} W^K &= \exp\left[j2\pi \frac{K}{L}\right] \\ &= \exp\left[j2\pi \frac{pL + q}{L}\right] \\ &= \exp\left[j2\pi \left(p + \frac{q}{L}\right)\right] \\ &= \exp\left[j2\pi \frac{q}{L}\right] \end{aligned} \quad (28)$$

Expression (28) shows that the phase of the component $W^K$ is equivalent to $$2\pi \frac{q}{L}$$

in accordance with expression (27a). The integer q can take all the integers from 0 to $L-1$ as shown in expression (27b), and thus the phase of $W^K$ takes an L number of values at a pitch of $$\frac{2\pi}{L}$$

from 0 to $$2\pi \frac{L-1}{L}.$$

As an example, the vector diagram of the components $W^K$ in case of L=8 is shown in FIG. 7. As shown in FIG. 7, the phase of the components of the polyphase orthogonal sequence in the case of L=8 takes the 8-number of values at a pitch of $\pi/4$. In a case that the polyphase orthogonal sequence is used, therefore, it is necessary to phase modulate the sinusoidal wave signal using the L-number of phases.

FIG. 8 shows an example of configuration of the modulator 2 shown in FIG. 2 wherein the sinusoidal wave signal $e^{j\omega t}$ is code-modulated by applying such polyphase orthogonal sequence as mentioned above. In FIG. 8, 19a, 19b, ..., 19c and 19d are phase shifters, 20 a controller, and 21 a switch. The phase shifters 19a, 19b, ..., 19c and 19d act to advance the phase of the sinusoidal wave signal transferred from the local oscillator 1 shown in FIG. 2 by an amount of $$\frac{2\pi}{L}, \frac{2\pi \cdot 2}{L}, \ldots, \frac{2\pi(L-2)}{L}, \frac{2\pi(L-1)}{L},$$

respectively. The switch 21 is operated to select one of the shifters to which the sinusoidal wave signal is transferred for every $\tau$ time and this operation responds to a command signal C transferred from the controller 20. The controller 20 calculates the phase of the components $W^K$ of the polyphase orthogonal sequence to produce the command signal C corresponding to the integer value q. If q=0, for example, the controller 20 produces a command signal C with which the switch 21 connects its terminal I to its terminal O, and if q=L−1, it produces another command signal C to operate the switch 21 for connection between its terminal I and D.

In this manner, when a code-modulation is performed with a polyphase orthogonal sequence, it is necessary to change the L-number of the phases and thus the (L−1)-number of phase shifters are required.

As described above, the conventional techniques require a plurality of phase shifters to be provided in the code-modulator, when the sinusoidal wave signal is code-modulated by using the polyphase orthogonal sequence in a radar system, for example. The number of the phase shifters depends upon the period N of the polyphase orthogonal sequence and is equal to $$\sqrt{N} - 1.$$

Therefore, there is the problem that when the code-modulation is performed by using a polyphase orthogonal sequence the hardware of the modulator becomes overly large.

SUMMARY OF THE INVENTION

The present invention was made to solve the problems described above, and it is an object of this invention to provide an apparatus for generating an orthogonal sequence the components of which take only two kinds of complex number.

According to the present invention, such a purpose is achieved by an apparatus for generating an orthogonal sequence which comprises an M-sequence generator for generating an M-sequence the components of which are 0 and 1 and the period is N and substitution means (component-substituting unit) connected to the output stage of the M-sequence generator for substituting the components of the M-sequence input thereto in response to their value of 0, 1, wherein if the component of the M-sequence is 0 it is substituted for by $A_o e^{j\phi_o}$, where $A_o$ is a positive real number, and if the component is 1 it is substituted for by $A_1 e^{j\phi_1}$, where $A_1$ is a positive real number, and the substitution being performed to satisfy such condition that a trigonometric function $f_1(\phi_1 - \phi_o)$ having a phase of $(\phi_1 - \phi_o)$ is a ratio of two functions $f_2$ which is a quadratic function of $A_1/A_o$ with a coefficient of a linear function of the period N of the M-sequence and $f_3$ which is a linear function of $A_1/A_o$ with a coefficient of a linear function of N, whereby the orthogonal sequence is generated.

DESCRIPTION OF THE PREFERRED EMBODIMENTS

Figure 9:
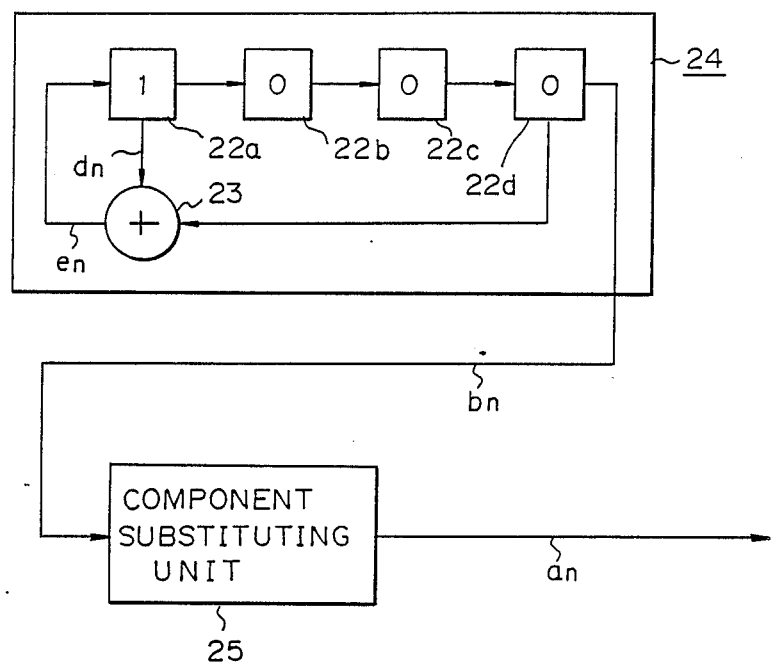
FIG. 9 is a diagram showing an arrangement of an orthogonal sequence generator utilizing the orthogonal sequence generating system in accordance with the present invention.

The present invention will now be described by way of an embodiment with reference to the drawings. In FIG. 9, numeral 24 denotes an M-sequence generator comprising linear feedback shift register (herein appropriately referred to as linear feedback shift register), 22a, 22b, 22c, 22d delay elements, 23 an exclusive OR operation unit, and 25 a component-substituting unit operable as a means for substituting a complex number for the value of the component of the M-sequence, the unit being comprised of a microcomputer, etc.

The delay elements 22a-22d store numerical values having 0 or 1. The transfer of the numerical values of those delay elements has a period and the numerical values are transferred at every 1 clock in the direction of the arrow shown in FIG. 9. The numerical value $b_n$ is outputted as a component of the M-sequence to the exterior and transferred to the component-substituting unit 25. The exclusive OR operation unit 23 calculates the exclusive OR of the numerical values $b_n$ and $d_n$ transferred from the delay elements 22a and 22d and transfers the resultant numerical value $e_n$ to the delay element 22a. The definition of the exclusive OR is shown in Table 2.

TABLE 2

| Output | | Input |
|---|---|---|
| $b_n$ | $d_n$ | $e_n$ |
| 0 | 0 | 0 |
| 0 | 1 | 1 |
| 1 | 0 | 1 |
| 1 | 1 | 0 |

In such a linear feedback shift register, the sequence created by providing at least one delay element with an initial value of, or other than providing each of the delay elements with initial value of 0 is a known M-sequence. The M-sequence is of the maximum period among the sequences created from the linear feedback shift register. In the embodiment of FIG. 9, the delay elements in the linear feedback shift register are arranged at four stages, but they can generally be extended at k-stages. However, it is necessary to satisfy some limited combination of the feedback tap position in order to create the M-sequence with the k-stage linear feedback shift register. Such combinations have already been obtained. One example of the combinations is shown in Table 3.

TABLE 3

| Stage | Code length | Longest connection tap |
|---|---|---|
| 2* | 3 | [2.1] |
| 3* | 7 | [3.1] |
| 4 | 15 | [4.1] |
| 5* | 31 | [5.2] [5.4.3.2] [5.4.2.1] |
| 6 | 63 | [6.1] [6.5.2.1] [6.5.3.2] |
| 7* | 127 | [7.1] [7.3] [7.3.2.1] [7.4.3.2] [7.6.4.2] [7.6.3.1] [7.6.5.2] [7.6.5.4.2.1] [7.5.4.3.2.1] |
| 8 | 255 | [8.4.3.2] [8.6.5.3] [8.6.5.2.] [8.5.3.1] [8.6.5.1] [8.7.6.1] [8.7.6.5.2.1] [8.6.4.3.2.1] |
| 9 | 511 | [9.4] [9.6.4.3] [9.8.5.4] [9.8.4.1] [9.5.3.2] [9.8.6.5] [9.8.7.2] [9.6.5.4.2.1] [9.7.6.4.3.1] [9.8.7.6.5.3] |
| 10 | 1023 | [10.3] [10.8.3.2] [10.4.3.1] [10.8.5.1] [10.8.5.4] [10.9.4.1] [10.8.4.3] [10.5.3.2] [10.5.2.1] [10.9.4.2] |
| 11 | 2047 | [11.1] [11.8.5.2] [11.7.3.2] [11.5.3.5] [11.10.3.2] [11.6.5.1] [11.5.3.1] [11.9.4.1] [11.8.6.2] [11.9.8.3] |
| 12 | 4095 | [12.6.4.1] [12.9.3.2] [12.11.10.5.2.1] [12.11.6.4.1] [12.11.9.7.6.5] [12.11.9.5.3.1] [12.11.9.8.7.4] [12.11.9.7.6.5] [12.9.8.3.2.1] [12.10.9.8.6.2] |
| 13* | 8191 | [13.4.3.1] [13.10.9.7.5.4] [13.11.8.7.4.1] [13.12.8.7.6.5] [13.9.8.7.5.1] [13.12.6.5.4.3] [13.12.11.9.5.3] [13.12.11.5.2.1] [13.12.9.8.4.2] [13.8.7.4.3.2] |
| 14 | 16.383 | [14.12.2.1] [14.13.4.2] [14.13.11.9] [14.10.6.1] [14.11.6.1] [14.12.11.1] [14.6.4.2] [14.11.9.6.5.2] [14.13.6.5.3.1] [14.13.12.8.4.1] [14.8.7.6.4.2] [14.10.6.5.4.1] [14.13.12.7.6.3] [14.13.11.10.8.3] |
| 15 | 32.767 | [15.13.10.9] [15.13.10.1] [15.14.9.2] [15.1] [15.9.4.1] [15.12.3.1] [15.10.5.4] [15.10.5.4.3.2] [15.11.7.6.2.1] [15.7.6.3.2.1] [15.10.9.8.5.3] [15.12.5.4.3.2] [15.10.9.7.5.3] [15.13.12.10] [15.13.10.2] [15.12.9.1] [15.14.12.2] [15.13.9.6] [15.7.4.1] [15.4] [15.13.7.4] |
| 16 | 65.535 | [16.12.3.1] [16.12.9.6] [16.9.4.3] [16.12.7.2] [16.10.7.6] [16.15.7.2] [16.9.5.2] [16.13.9.6] [16.15.4.2] |

TABLE 3-continued

| Stage | Code length | Longest connection tap |
|---|---|---|
| 17° | 131.071 | [16.15.9.4] [17.3] [17.3.2.1] [17.7.4.3] [17.16.3.1] [17.12.6.3.2.1] [17.8.7.6.4.3] [17.11.8.6.4.2.] [17.9.8.6.4.1] [17.16.14.10.3.2] [17.12.11.8.5.2] |
| 18 | 262.143 | [18.7] 18.10.7.5] [18.13.11.9.8.7.6.3] [18.17.16.15.10.9.8.7] [18.15.12.11.9.8.7.6] |
| 19° | 524.287 | [19.5.2.1] [19.13.8.5.4.3] [19.12.10.9.7.3] [19.17.15.14.13.12.6.1] [19.17.15.14.13.9.8.4.2.1] [19.16.13.11.10.9.4.1] [19.9.8.7.6.3] [19.16.15.13.12.9.5.4.2.1] [19.18.15.14.11.10.8.5.3.2] [19.18.17.16.12.7.6.5.3.1] |
| 20 | 1.048.575 | [20.3] [20.9.5.3] [20.19.4.3] [20.11.8.6.3.2] [20.17.14.10.7.4.3.2] |
| 21 | 2.097.151 | [21.2] [21.14.7.2] [21.13.5.2] [21.14.7.6.3.2] [21.8.7.4.3.2] [21.10.6.4.3.2] [21.15.10.9.5.4.3.2] [21.14.12.7.6.4.3.2] [21.20.19.18.5.4.3.2] |
| 22 | 4.194.303 | [22.1] [22.9.5.1] [22.20.18.16.6.4.2.1] [22.19.16.13.10.7.4.1] [22.17.9.7.2.1] [22.17.13.12.8.7.2.1] [22.14.13.12.7.3.2.1] |
| 23 | 8.388.607 | [23.5] [23.17.11.5] [23.5.4.1] [23.12.5.4] [23.21.7.5] [23.16.13.6.5.3] [23.11.10.7.6.5] [23.15.10.9.7.5.4.3] [23.17.11.9.8.5.4.1] [23.18.16.13.11.8.5.2] |
| 24 | 16.777.215 | [24.7.2] [24.4.3.1] [24.22.20.18.16.14.11.9.8.7.5.4] [24.21.19.18.17.16.15.14.13.10.9.5.4.1] |
| 25 | 33.554.431 | [25.3] [25.3.2.1] [25.20.5.3] [25.12.4.3] [25.17.10.3.2.1] [25.23.21.19.9.7.5.3] [25.18.12.11.6.5.4] [25.20.16.11.5.3.2.1] [25.12.11.8.7.6.4.3] |
| 26 | 67.108.863 | [26.6.2.1] [26.22.21.16.12.11.10.8.5.4.3.1] |
| 27 | 134.217.727 | [27.5.2.1] [27.18.11.10.9.5.4.3] |
| 28 | 268.435.455 | [28.3] [28.13.11.9.5.3] [28.22.11.10.4.3] [28.24.20.16.12.8.4.3.2.1] |
| 29 | 536.870.911 | [29.2] [29.20.11.2] [29.13.7.2] [29.21.5.2] [29.26.5.2] [29.19.16.6.3.2] [29.18.14.6.3.2] |
| 30 | 1.073.741.823 | [30.23.2.1] [30.6.4.1] [30.24.20.16.14.13.11.7.2.1] |
| 31° | 2.147.483.647 | [31.29.21.17] [31.28.19.15] [31.3] [31.3.2.1] [31.13.8.3] [31.21.12.3.2.1] [31.20.18.7.5.3] [31.30.29.25] [31.28.24.10] [31.20.15.5.4.3] [31.16.8.4.3.2] |
| 32 | 4.294.967.295 | [32.22.2.1] [32.7.5.3.2.1] [32.28.19.18.16.14.11.10.9.6.5.1] |
| 33 | 8.589.934.591 | [33.13] [33.22.13.11] [33.26.14.10] [33.6.4.1] [33.22.16.13.11.8] |
| 61° | 2.305.843.009 213.693.951 | [61.5.2.1] |
| 89° | 618.970.019. 642.690.137. 449.662.112 | [89.6.5.3] |

In Table 3, the number s of the connection taps are corresponding to those of the delay elements, for example, in FIG. 9 the delay element 22a is number 1, the delay element 22b is number 2, the delay element 22c is number 3 and the delay element 22d is number 4.

The period N of the M-sequence created by the feedback shift register the tap combination of which is shown in Table 3 is determined by the number of stage k of the linear feedback shift register and given by the following expression:

$$N = 2^k - 1 \tag{29}$$

In the case of four stage as shown in FIG. 9, the period of the M-code sequence is 15. Thus, that figure shows the case of $k=4$ and $N=15$.

The component-substituting unit 25 is then inputted with the M-sequence $\{b_n\}$ created by the linear feedback shift register 24, thereby substituting the component $a_n$ for the component $b_n$.

Figure 10:
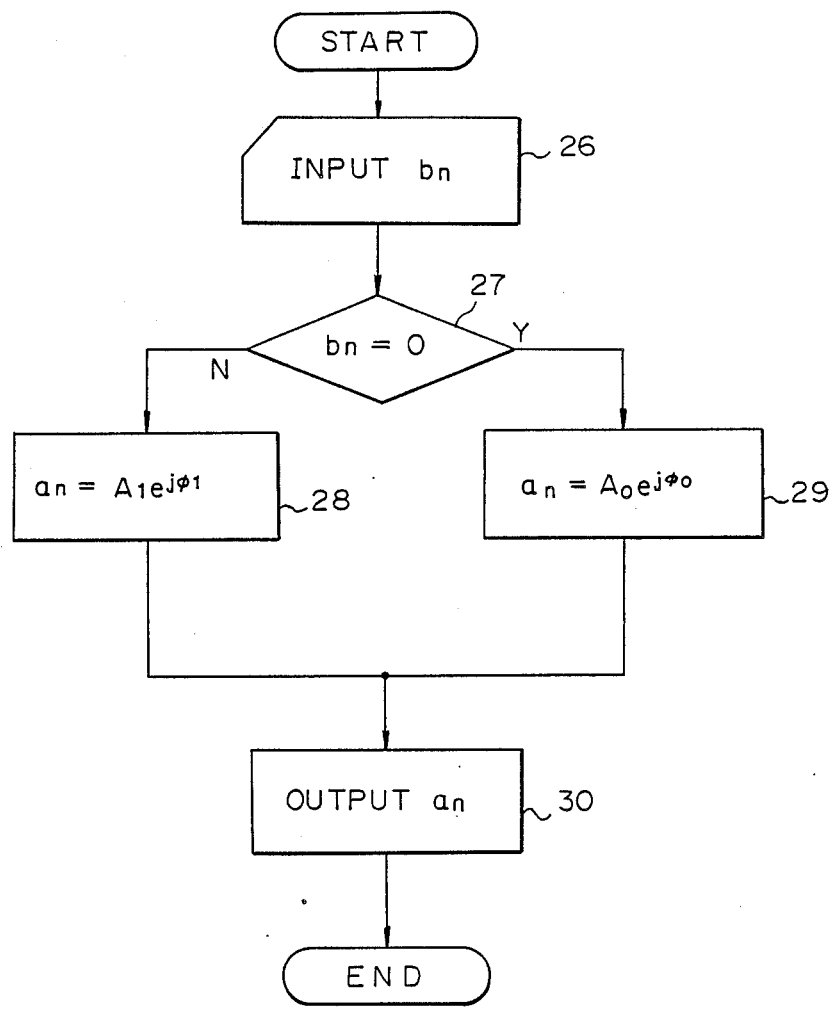
FIG. 10 is a flowchart showing the operation of a component-substituting unit shown in FIG. 9.

The operation of the component-substituting unit 25 will then be described by referring to the flowchart shown in FIG. 10. The components $b_n$ successively transferred from the linear feedback shift register 24 are input to the component-substituting unit 25. The values of the components are checked at step 27. If $b_n=0$, then step 29 is executed, and if $b_n=1$, then step 28 is executed. By the execution of step 28, the value of the component $a_n$ is set at the following complex number and output to the exterior at step 30:

$$a_n = A_1 e^{j\phi_1} \tag{30}$$

On the other hand, by the execution of step 29, the value of the component $a_n$ is set at the following complex number and output to the exterior at step 30.

$$a_n = A_0 e^{j\phi_0} \tag{31}$$

At this time, the parameters $A_1$, $\phi_1$ in expression (31) and the parameters $A_0$, $\phi_0$ in expression (30) are determined to satisfy the following expression:

$$\cos(\phi_1 - \phi_0) = -\frac{(N+1)\left(\frac{A_1}{A_0}\right)^2 + (N-3)}{2(N+1)\frac{A_1}{A_0}} \tag{32}$$

As shown in expression (32), the phase difference $\phi_1 - \phi_0$ and the amplitude ratio $A_1/A_0$ are important, and in normal operation the following expression can be satisfied.

$$\phi_0 = 0 \tag{33a}$$

$$A_0 = 1, \text{ or } A_0 = A_1 = 1 \tag{33b}$$

It will be described below that the sequence $\{a_n\}$ created in this manner are of an orthogonal sequence.

In the embodiment of the present invention, the autocorrelation function of the sequence $\{a_n\}$ out of the range of $m=0$ is expressed by expression (34) in accordance with expression (4):

$$\rho(m) = \frac{1}{N}\{\alpha A_0^2 + \beta A_0 A_1 e^{j(\phi_1 - \phi_0)} + \gamma A_0 A_1 e^{-j(\phi_1 - \phi_0)} + \delta A_1^2\} \tag{34}$$

$$(m = 1, 2, \ldots, N-1)$$

where,
- $\alpha$: number of combinations of components for which $a_n$ and $a_{n+m}$ are both $A_0 e^{j\phi_0}$,
- $\beta$: number of combination of components for which $a_n$ is $A_0 e^{j\phi_0}$ and $a_{n+m}$ is $A_1 e^{j\phi_1}$,
- $\gamma$: number of combination of components for which $a_n$ is $A_1 e^{j\phi_1}$ and $a_{n+m}$ is $A_0 e^{j\phi_0}$,
- $\delta$: number of combination of components for which $a_n$ and $a_{n+m}$ are both $A_1 e^{j\phi_1}$.

Since the sequence $\{a_n\}$ is obtained by substituting the components of the M-sequence $\{b_n\}$, $\alpha$, $\beta$, $\gamma$ and $\delta$ can be considered as follows:

$\alpha$: number of combination of components for which $b_n$ and $b_{n+m}$ are both 0, $\beta$: number of combination of components for which $b_n$ is 0 and $b_{n+m}$ is 1, $\gamma$: number of combination of components for which $b_n$ is 1 and $b_{n+m}$ is 0, $\delta$: number of combination of components for which $b_n$ and $b_{n+m}$ are both 1.

$\alpha$, $\beta$, $\gamma$ and $\delta$ can take a constant value irrespective of the value of m in the view of the properties of the M-sequence. The properties of the M-sequence necessary for obtaining the values of $\alpha$, $\beta$, $\gamma$ and $\delta$ will be described below and those are also disclosed in "CODE THEORY" (Third Edition) by Miyakawa, Iwadare, et al., published from Shoko-do on July 20, 1976.

(1) The period N of M-sequence is $2^k-1$ ($N=2^k-1$).

(2) In one period of M-sequence, $(2^{k-1}-1)$ number of 0 and $(2^{k-1})$ number of 1 are contained.

(3) Vector $B_i$ ($i=0, \ldots, N-1$) is defined by using components $\{b_0, b_1, \ldots, b_{N-1}\}$ in one period of M-sequence $\{b_n\}$ as shown below:

$$
\begin{aligned}
B_0 &= (b_0, b_1, \ldots, b_{N-1}) \\
B_1 &= (b_1, b_2, \ldots, b_0) \\
&\vdots \\
B_{N-1} &= (b_{N-1}, b_0, \ldots, b_{N-2})
\end{aligned}
\tag{35}
$$

The Hamming distance $d_H(B_i, B_j)$ of the above vectors $B_i$ and $B_j$ can be obtained and shown by expression (36), irrespective of the combination of $B_i$ and $B_j$:

$$d_H(B_i, B_j) = 2^{k-1} \quad (i \neq j) \tag{36}$$

Here, "Hamming distance $d_H$" is defined as expression (37a) when two vectors are expressed by $A=(a_0, a_1, \ldots, a_{N-1})$ and $B=(b_0, b_1, \ldots, b_{N-1})$.

$$d_H(A, B) = \sum_{n=0}^{N-1} \epsilon_n \tag{37a}$$

wherein, $$\epsilon_n \begin{cases} 0 & a_n = b_n \\ 1 & a_n \neq b_n \end{cases} \tag{37b}$$

The values of $\alpha$, $\beta$, $\gamma$ and $\delta$ can be obtained by comparing the components of vectors $B_0$ and $B_m$ ($m=1, 2, \ldots, N-1$).

First, the sum of $\alpha$ and $\delta$ is the number of components for which $\epsilon_n$ of expression (37b) is 0, however replacing vectors A and B with vectors $B_0$ and $B_m$. Since the Hamming distance of $B_0$ and $B_m$ is $2^{k-1}$, irrespective of the value of m, as shown by expression (36), the sum is represented as follows:

$$\alpha+\delta = N - 2^{k-1} = 2^k - 1 - 2^{k-1} = 2^{k-1} - 1 \tag{38}$$

$\beta$ and $\gamma$ will be considered below.

Again, the number of combination $\beta$ of components in the case of $b_n=0$ for vector $B_0$ and $b_{n+m}=1$ for vector $B_m$ can be expressed by follows:

$$\beta = 2^{k-2} + d \tag{39}$$

Then, the number $\beta$ of combination $\gamma$ of components in the case of $b_n=1$ for vector $B_0$ and $b_{n+m}=0$ for vector $B_m$ can also be expressed by:

$$\gamma = 2^{k-2} - d \tag{40}$$

This is because the Hamming distance of vectors $B_0$ and $B_m$ can be represented as follows:

$$d_H(B_0, B_m) = \beta + \gamma = 2^{k-1}.$$

On the other hand, due to the properties of M-sequence, the number of 0-value components of vector $B_0$ is $2^{k-1}-1$, and the number of 1-value components is $2^{k-1}$, and thus the number $p_0$ of the remaining 0-value components of vector $B_0$ and the number $p_1$ of the remaining 1-value components thereof are given by the following expressions:

$$p_0 = 2^{k-1} - 1 - \beta = 2^{k-2} - 1 - d \tag{41a}$$

$$p_1 = 2^{k-1} - \gamma = 2^{k-2} + d \tag{41b}$$

Similarly, the number $q_0$ of the remaining 0-value components of vector $B_m$ and the number $q_1$ of the remaining 1-value components thereof are given by the following expressions:

$$q_0 = 2^{k-1} - 1 - \gamma = 2^{k-2} - 1 + d \tag{42a}$$

$$q_1 = 2^{k-1} - \beta = 2^{k-2} - d \tag{42b}$$

However, since both $p_0$ and $q_0$ represent the numbers of combination of the components in the case of $b_n=0$ for vector $B_0$ and $b_{n+m}=0$ for vectors $B_m$, the following condition must be satisfied:

$$p_0 = q_0 \tag{43a}$$

Similarly, both $p_1$ and $q_1$ both represent the numbers of combination of the components in the case of $b_n=1$ for vector $B_0$ and $b_{n+m}=1$ for vector $B_m$, and therefore the following condition must be satisfied:

$$p_1 = q_1 \tag{43b}$$

From expressions (43a) and (43b), $d=0$, and thus $\beta$ and $\gamma$ are equal to each other and are given by the following expression, irrespective of the value of m:

$$\beta = \gamma = 2^{k-2} \tag{45}$$

Since the number of 0-value components and the number of 1-value components of vector $B_0$ (and vector $B_m$) are $(2^{k-1}-1)$ and $2^{k-1}$ respectively, as mentioned above, $\alpha$, $\beta$, $\gamma$ and $\delta$ must be satisfy the following relations:

$$\alpha + \gamma = \alpha + \beta = 2^{k-1} - 1 \tag{46a}$$

$$\beta + \delta = \gamma + \delta = 2^{k-1} \tag{46b}$$

By substituting expression (45) for expressions (46a) and (46b), the following relations are obtained:

$$\alpha = 2^{k-2} - 1 \tag{47}$$

$$\delta = 2^{k-2} \tag{48}$$

α and δ obtained by expressions (47) and (48) satisfy expression (38) and accordingly, there is no contradiction.

β and γ obtained by expression (45), α by expression (47) and δ by expression (48) substitute for expression (34) and then the autocorrelation function of the sequence $\{a_n\}$ of the present embodiment can be written as follows:

$$\rho(m) = \frac{1}{N} \{(2^{k-2} - 1)A_0^2 + 2^{k-2} A_0 A_1 e^{j(\phi_1-\phi_0)} + 2^{k-2} A_0 A_1 e^{-j(\phi_1-\phi_0)} + 2^{k-2} A_1^2\} \quad (49)$$

$$= \frac{A_0^2}{N} \left\{ (2^{k-2} - 1) + 2^{k-1} \left[ \frac{A_1}{A_0} \right] \cos(\phi_1 - \phi_0) + 2^{k-2} \left[ \frac{A_1}{A_0} \right]^2 \right\}$$

$$(m = 1, 2, \ldots, N - 1)$$

Since the condition under which the sequence $\{a_n\}$ is an orthogonal sequence is $\rho_{(m)}=0$, (m=1, 2, ..., N−1), as mentioned above concerning the expression (7), expression (32) can be obtained from expressions (49) and (29).

From the foregoing, it is understood that the sequence generated in the above-described embodiment is an orthogonal sequence.

Figure 11:
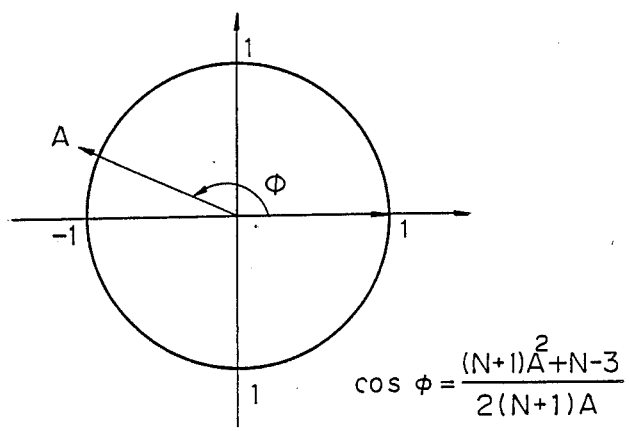
FIGS. 11 and 12 are vector diagrams of the components of the orthogonal sequence generated from embodiments of the present invention.
Figure 12:
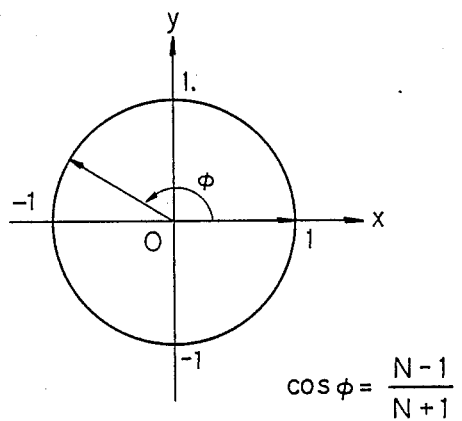

FIG. 11 is a vector diagram of the component of the orthogonal sequence of the embodiment of this invention (however, $A_0=1$, and thus the ratio $A=A_1/A_0=A_1$). In the orthogonal sequence of the embodiment of this invention, as shown in FIG. 11, the components can take two values, 1 and $Ae^{j\phi}$, and thus the amplitudes thereof are 1 and A. Moreover, the case of $A_0=A_1=1$, the components take 1 and $e^{j\phi}$, and the amplitudes are all 1, as shown in FIG. 12.

Figure 1:
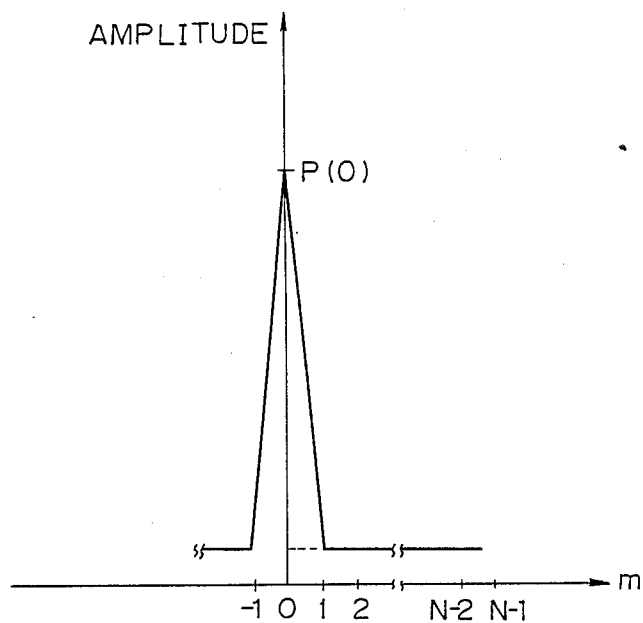
FIG. 1 is a diagram showing a waveform of an autocorrelation function.
Figure 2:
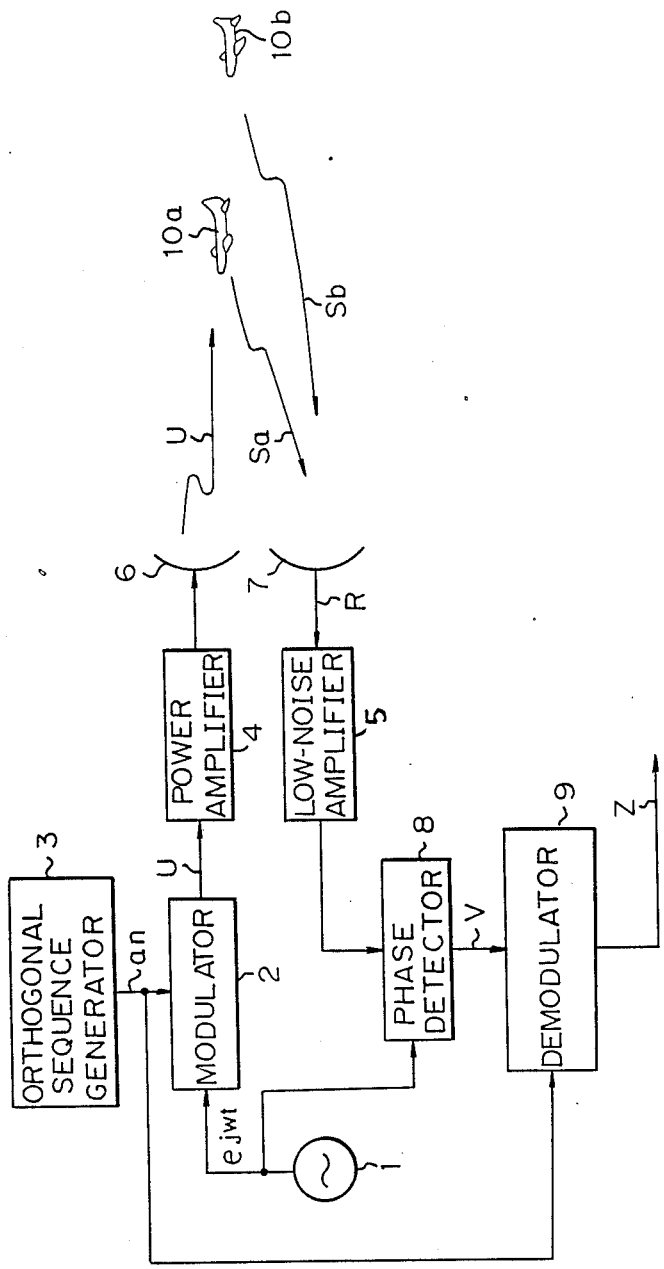
FIG. 2 is a schematic representation showing a radar arrangement for exemplifying the system to which the orthogonal sequence generator is applicable.
Figure 3:
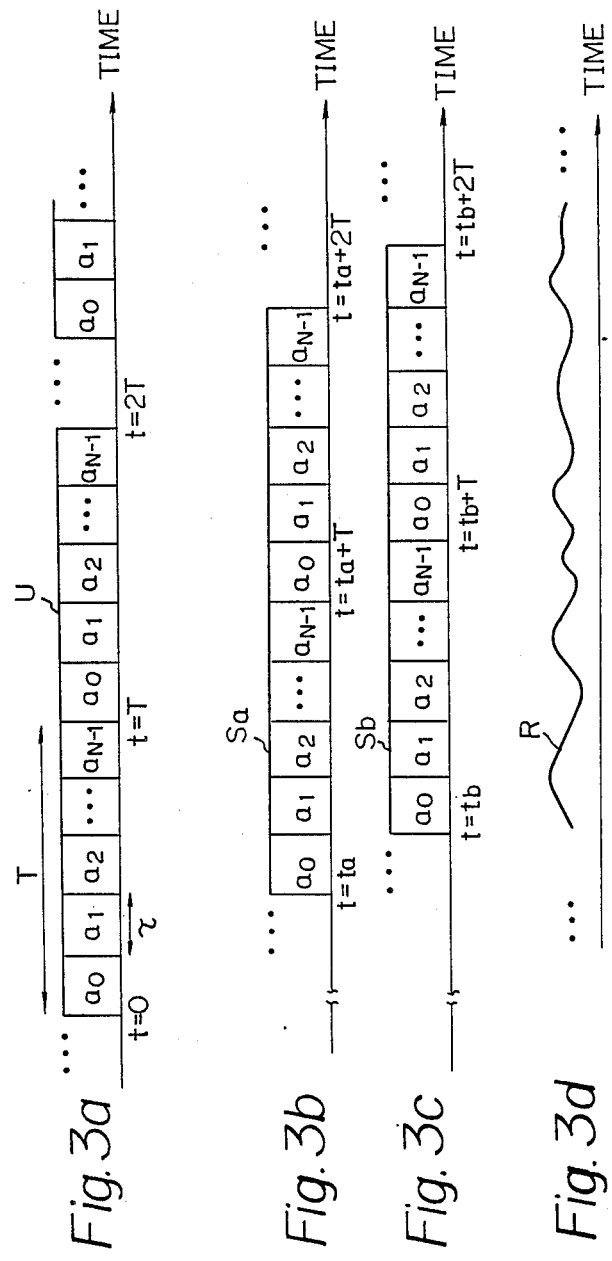
FIGS. 3(a)-(d) are diagrams showing the timing of transmission and receiving signals of the radar system.
Figure 4:
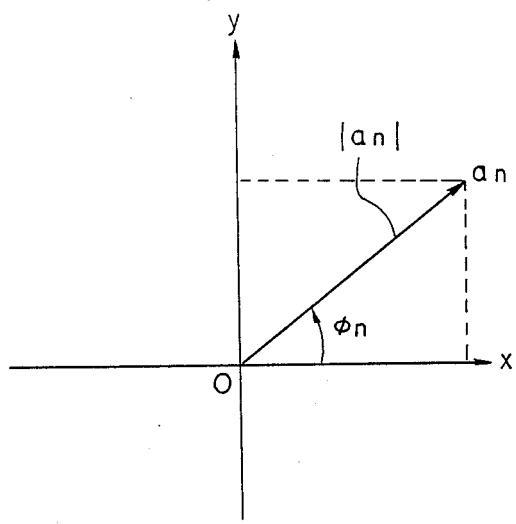
FIG. 4 is a vector diagram of a component of the sequence.
Figure 7:
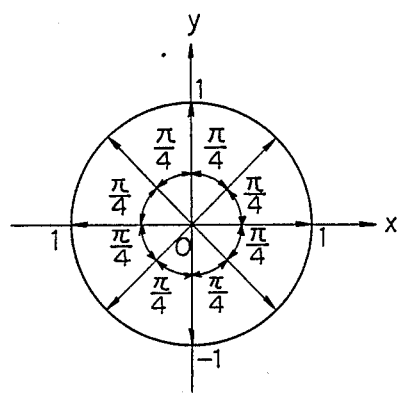
FIG. 7 is a vector diagram of a component of the polyphase orthogonal sequence.
Figure 5A:
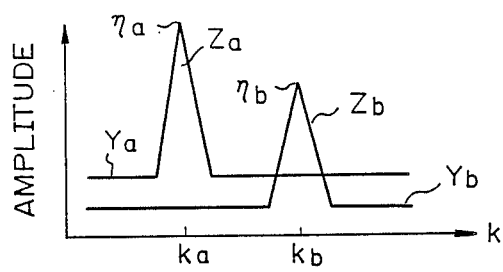
FIGS. 5(a)-(c) are diagrams showing waveforms of a demodulated signal.
Figure 5B:
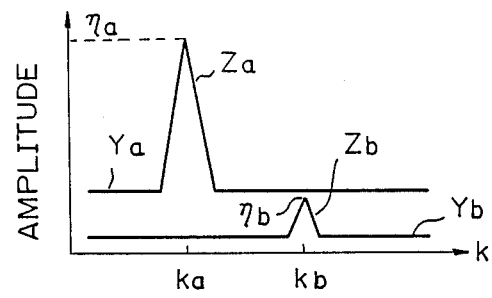
Figure 5C:
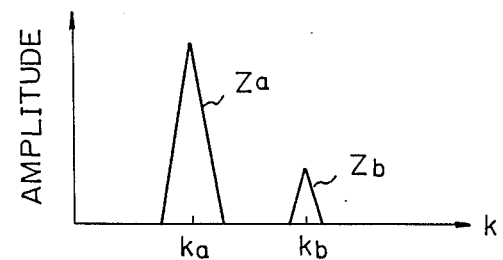
Figure 6:
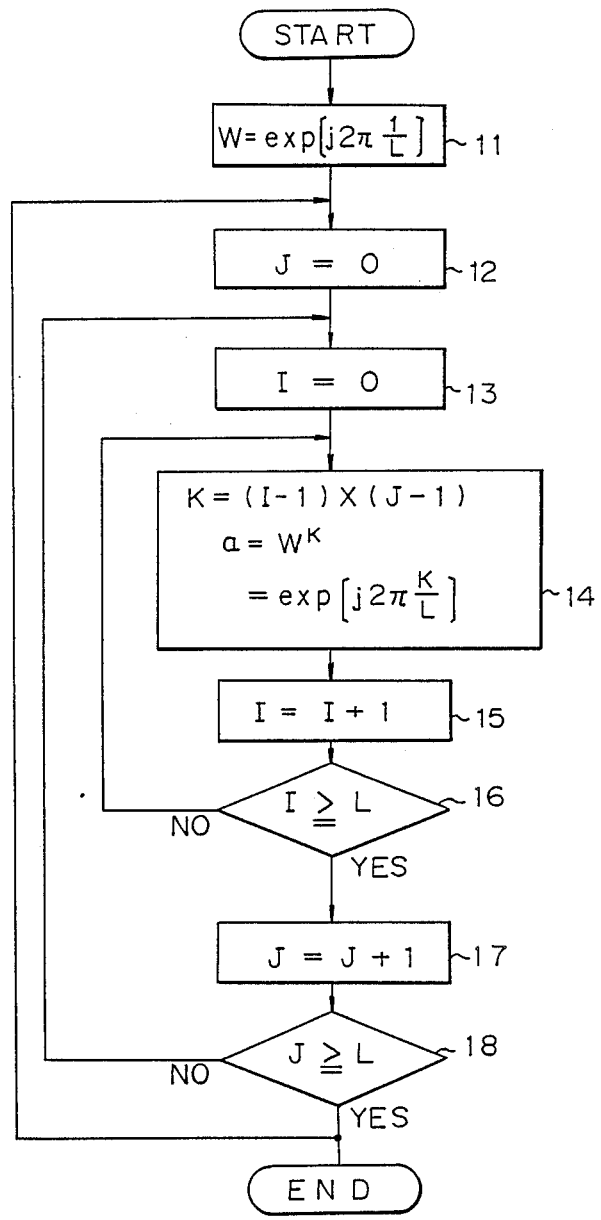
FIG. 6 is a flowchart showing the algorithm for forming a polyphase orthogonal sequence.
Figure 8:
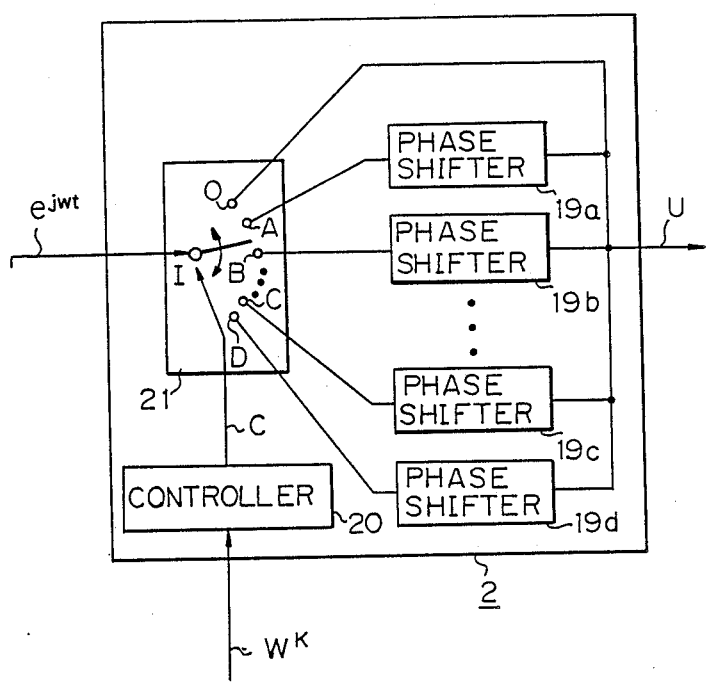
FIG. 8 is a detailed block diagram of a conventional modulator.
Figure 13:
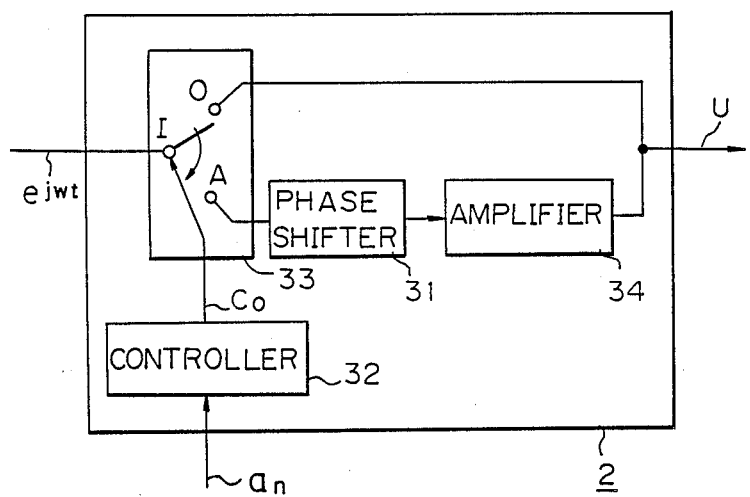
FIGS. 13 and 14 are detailed block diagrams of a modulator in accordance with the present invention.

Shown in FIG. 13 is an exemplary arrangement of the modulator 2 for code-modulating the sinusoidal wave signal for use with the radar system shown in FIG. 2, to which the orthogonal sequence $\{a_n\}$ generated by the above-mentioned orthogonal sequence generator of this invention is applied. In this example, there is a definition of $\phi_0=0$ and $A_0=1$. In FIG. 13, numeral 31 is a phase shifter, 32 a controller, 33 a switch and 34 an amplifier. The phase shifter 31 acts to advance by $\phi$, or $\phi_1$ the phase of the sinusoidal wave signal transferred from the local oscillator 1 (shown in FIG. 2). The amplifier 34 acts to simplify A-times ($A=A_1$) the amplitude of the sinusoidal wave signal input through the switch 33 and the phase shifter 31. With this, $\phi$ and A need to satisfy the following relation:

$$\cos \phi = -\frac{(N + 1)A^2 + N - 3}{2(N + 1)A} \quad (50)$$

(N: period of M-sequence)

The switch 33 is operated to change the destination of the transferred sinusoidal wave signal for every τ-time in response to command signal $C_0$ transferred from the controller 32. The controller 32 calculates the amplitude and phase each of the components of the orthogonal sequence generated by the orthogonal sequence generator of the present invention, thereby generating the command signal $C_0$ corresponding to the amplitude and phase of the component. For example, when the amplitude is 1 and the phase is 0, a command signal $C_0$ is generated for the switch 33 to connect its terminal I to its terminal 0, and when the amplitude is $A_1$ and the phase is $\phi_1$ another command signal $C_0$ is generated for the switch 33 to connect the terminal I to its terminal A.

Figure 14:
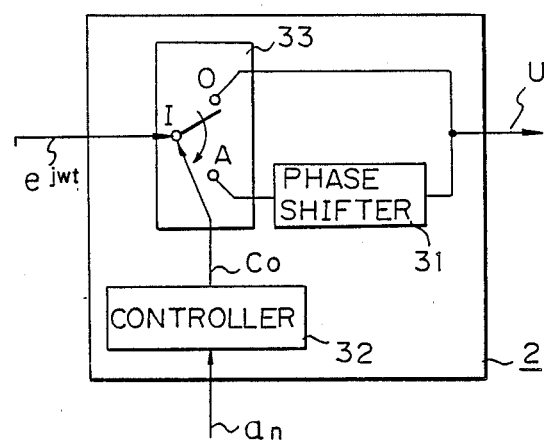

With the orthogonal sequence generating apparatus of the embodiment of the present invention, therefore, in the event that code-modulation is performed in a radar system, for example, it is sufficient to provide two-position changing operations of the phase and thus provide a single phase shifter and a single amplifier. Moreover, when setting $A_0=A_1=1$, there is no need to provide any amplifier and the arrangement of the modulator 2 is thus must more simple as shown in FIG. 14.

Although the above-described embodiment is provided with a linear feedback shift register for constituting the M-sequence generator, the present invention can be widely applied to other M-sequence generators than the linear feedback shift register. Moreover, it is a matter of course that the present invention can be applied to a system for processing signals other than radar systems.

As described above, according to the present invention, there is provided an arrangement for generating two types of orthogonal sequence whose components take two of complex number, so that the phase shifter necessary to arrange the code-modulator in a radar system, for example, can be only one in number and thus the structure of the code-modulator is simple and cheap.

While the preferred embodiments of the present invention has been described, it is to be understood that modifications will be apparent to those skilled in the art without departing from the spirit of the invention.

The scope of the invention, therefore, is to be determined solely by the following claims.

What is claimed is:

1. An apparatus for generating an orthogonal sequence comprising M-sequence generating means for outputting a signal of M-sequence of which the component takes 0 or 1 and the period is N, and substitution means connected to an output of said M-sequence generating means for substituting the component of the M-sequence to provide an output signal as the orthogonal sequence signal, said substitution means substituting the component of the M-sequence with $A_0 e^{j\phi_0}$ when the value of the component is 0 and with $A_1 e^{j\phi_1}$ when it is 1, where each of $A_0$ and $A_1$ is a positive real number, and the substitution being made in such a manner that the phase difference of $\phi_1-\phi_0$ and the amplitude ratio of $A_1/A_0$ satisfy the following condition:

$$f_1(\phi_1 - \phi_0) = \frac{f_2(A_1/A_0)}{f_3(A_1/A_0)}$$

where, $f_1$ is a trigonometric function having the phase of $\phi_1-\phi_0$; $f_2$ is a quadratic function of $A_1/A_0$ with a coefficient of a linear function of N; and $f_3$ is a linear function of $A_1/A_0$ with a coefficient of a linear function of N.

2. An apparatus as set forth in claim 1, wherein $$f_1(\phi_1 - \phi_0) = \cos(\phi_1 - \phi_0);$$

$$f_2(A_1/A_0) = (N + 1)(A_1/A_0)^2 + N - 3; \text{ and}$$

$$f_3(A_1/A_0) = 2(N + 1)A_1/A_0.$$

3. An apparatus as set forth in claim 1 or 2, wherein $\phi_0=0$.

4. An apparatus as set forth in claim 1 or 2, wherein $A_0=1$.

5. An apparatus as set forth in claim 1 or 2, wherein $\phi_0=0$ and $A_0=A_1=1$.

6. An apparatus as set forth in claim 1, wherein said M-sequence generator is arranged by a linear feedback shift register.

7. A code-modulation apparatus of a transmission/reception system, said apparatus including:

means for generating an orthogonal sequence comprising M-sequence generating means for outputting a signal of M-sequence of which the component takes 0 or 1 and the period is N, and substitution means connected to an output of said M-sequence generating means for substituting the component of the M-sequence to provide an output signal as the orthogonal sequence signal, said substitution means substituting the component of the M-sequence with $A_0 e^{j\phi_0}$ when the value of the component is 0 and with $A_1 e^{j\phi_1}$ when it is 1, where each of $A_0$ and $A_1$ is a positive real number, and the substitution being made in such a manner that the phase difference of $\phi_1-\phi_0$ and the amplitude ratio of $A_1/A_0$ satisfy the following condition:

$$f_1(\phi_1 - \phi_0) = \frac{f_2(A_1/A_0)}{f_3(A_1/A_0)}$$

where, $f_1$ is a trigonometric function having the phase of $\phi_1-\phi_0$; $f_2$ is a quadratic function of $A_1/A_0$ with a coefficient of a linear function of N; and $f_3$ is a linear function of $A_1/A_0$ with a coefficient of a linear function of N; and modulation means for code-modulating a local oscillation signal with the signal from said orthogonal sequence generating apparatus.

8. A code-modulation apparatus as set forth in claim 7, wherein said modulation means comprises:

switch means for selectively transferring the input local oscillation signal to a first or a second terminal;

control means coupled to the output of said orthogonal sequence generating means for controlling to change over said switch means in response to the output signal from said orthogonal sequence generating means;

phase-shifting means connected to said second terminal; and output stage coupled to said first terminal and the output terminal of the phase-shifting means for outputting the modulated signal.

9. A code-modulation apparatus as set forth in claim 8, wherein said output terminal of said phase-shifting means is connected to said output stage through amplification means.

10. A code-modulation apparatus as set forth in claim 8 or 9, wherein said switch means transfer said input local oscillation signal to said first terminal when said output signal from said orthogonal sequence generating means is $A_0 e^{j\phi_0}$, and to said second terminal when said output signal therefrom is $A_1 e^{j\phi_1}$.

11. A code-modulation apparatus as set forth in claim 7, wherein $$f_1(\phi_1 - \phi_0) = \cos(\phi_1 - \phi_0);$$

$$f_2(A_1/A_0) = (N + 1)(A_1/A_0)^2 + N - 3; \text{ and}$$

$$f_3(A_1/A_0) = 2(N + 1)A_1/A_0.$$

12. A code-modulation apparatus as set forth in claim 7 or 11, wherein $\phi_0=0$.

13. A code-modulation apparatus as set forth in claim 7 or 11, wherein $A_0=1$.

14. A code-modulation apparatus as set forth in claim 7 or 11, wherein $\phi_0=0$ and $A_0=A_1=1$.

15. A code-modulation apparatus as set forth in claim 7, wherein said system is a radar system.

* * * * *

UNITED STATES PATENT AND TRADEMARK OFFICE
CERTIFICATE OF CORRECTION

PATENT NO. : 4,939,745

DATED : July 3, 1990

INVENTOR(S) : Tetesuo Kiromoto, Takashi Hotta and Yoshimasa Ohashi

It is certified that error appears in the above-identified patent and that said Letters Patent is hereby corrected as shown below:

Col. 1, line 60, change "lobe" to --main lobe--.
Col. 6, line 55, change "L" to --J--;
Fig. 11, change "$\cos \phi = \frac{(N+1)A^2 + N - 3}{2(N+1)A}$" to
--$\cos \phi = -\frac{(N+1)A^2 + N - 3}{2(N+1)A}$--;
Fig. 12, change "$\cos \phi = \frac{(N-1)}{(N+1)}$" to
--$\cos \phi = -\frac{(N-1)}{(N+1)}$--;
Claim 2, Col. 16, line 65, change "$f_3(A1/A0) = 2(N+1)A1/A0$" to --$f_3(A1/A0) = - 2(N+1)A1/A0$--;
Claim 11, Col. 18, line 31, change "$f_3(A1/A0) = 2(N+1)A1/A0$" to --$f_3(A1/A0) = - 2(N+1)A1/A0$--.

Signed and Sealed this

Sixth Day of October, 1992

*Attest:*

DOUGLAS B. COMER

*Attesting Officer*       *Acting Commissioner of Patents and Trademarks*